United States Patent
Mason et al.

(10) Patent No.: US 6,292,320 B1
(45) Date of Patent: Sep. 18, 2001

(54) DISK DRIVE WITH DUAL STAGE ACTUATOR RADIAL OFFSET CALIBRATION

(75) Inventors: Jeffrey E. Mason; Michael Charles Stich, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/046,804

(22) Filed: Mar. 23, 1998

(51) Int. Cl.[7] .................................................. G11B 15/12
(52) U.S. Cl. ........................... 360/63; 360/76; 360/77.04; 360/78.05
(58) Field of Search .............................. 360/78.04, 78.12, 360/77.04, 77.05, 78.06, 78.09, 78.05, 77.08, 61, 63, 76

(56) References Cited

U.S. PATENT DOCUMENTS 5,901,010 * 5/1999 Glover et al. ..................... 360/78.12
5,920,441 * 7/1999 Cunningham et al. ........... 360/78.05
5,969,895 * 10/1999 Ueda et al. ............................ 360/61
6,067,206 * 5/2000 Hull et al. ......................... 360/77.08

* cited by examiner

Primary Examiner—Andrew L. Sniezek
(74) Attorney, Agent, or Firm—Milad G Shara

(57) ABSTRACT

In a disk drive having a dual stage actuator, a method to improve head switching time by aligning a target head with a target track before a head switch occurs by using a second stage actuator attached to the target head to align the target head with the new track. The radial offset required to align the target head with the target track is either calibrated at startup or is measured dynamically during normal disk operations. A dual stage actuator with either a milli-actuator second stage or a micro-actuator second stage, positions a read/write head over a disk surface. The disk drive has a radial offset table for storage of radial offsets for head switches.

4 Claims, 8 Drawing Sheets

DISK DRIVE WITH DUAL STAGE ACTUATOR RADIAL OFFSET CALIBRATION

FIELD OF THE INVENTION

The invention relates to a method in a disk drive to adjust the radial offset between heads of a dual stage actuator, where the dual stage actuator uses either a milli-actuator or a micro-actuator, to position a read/write head during a head switch.

BACKGROUND OF THE INVENTION

A huge competitive market exists for disk drives that store massive amounts of data in computers. This competition requires disk drive manufacturers to provide ever-increasing data storage capacity and higher performance in their products. One way to increase capacity is to provide more data tracks on a given disk surface, which generally requires that the tracks be more densely packed since the form factor of the disk is limited by compatibility standards. In current disk drives, track density or pitch of 10,000 tracks per inch is becoming available.

As tracks are placed closer together, the problem of maintaining a read/write transducer in position over the track becomes more difficult. The industry presently prefers a rotary type actuator, which employs a voice coil motor to pivotally swing an array of vertically stacked arms carrying read/write transducers over tracks disposed on surfaces of a corresponding stack of disks. A sampled servo system reads servo wedges interspersed at equal intervals around the data tracks to maintain the position of a transducer over a track. At some point in the march toward higher track densities, these conventional actuators and servo systems may be unable to provide the bandwidth and precision control required to keep the head positioned over a target track without encroaching adjacent tracks.

Dual stage actuators have been proposed as a solution to the bandwidth and precision control problem. The dual stage actuator generally provides two pivot points and two motors with a second stage motor and pivot point being smaller and positioned closer to the transducer, therefore providing for higher control bandwidth and precision. Typically the span or range of motion of the second stage actuator is limited to a few tracks or even to the width of a single track or less.

Dual stage actuators may be broadly characterized as milli-actuators or micro-actuators. In a milli-actuator design, the second stage actuator moves a suspension arm that suspends the read/write head. The milli-actuator can adjust the radial offset of the read/write head by moving the suspension arm, and thus the read/write head, in relation to the first stage pivot point.

In the micro-actuator design, the second stage, mounted on the suspension arm, moves the read/write head directly. The micro-actuator can adjust the position of the read/write head by moving the read/write head in relation to the suspension.

The performance of disk drives employing dual stage actuators, as in conventional disk drives, is and will be impacted by the time required to position a transducer over a target data track to perform a read or write operation, characterized as access time. One major component of access time is the time required to move or swing the actuator from a present track to a target track, known as seek time. Another significant component of access time is the time required to perform a head switch, which entails selecting a target transducer head on a different one of the vertically stacked arms of the actuator and establishing the precise position of that head over the present track. The head switch occurs frequently during read or write operations of sequential data where data is conventionally recorded on a stack of respective tracks at the same radial location on each disk surface, known as a cylinder. This recording technique has been historically employed to minimize the delay in continuing sequential data transfer because a head switch can be accomplished in less time than a seek.

Although the stacked arms and transducer heads in a disk drive are closely aligned, there are sufficient variations between the disks, arms and heads to require that the target head be re-positioned when a head switch is performed, even though the previous head was perfectly aligned over a corresponding track. This is especially true with more densely spaced tracks and the problem may even be exacerbated with dual stage actuators. The instantaneous difference in position between heads on the stacked arms owing to these variations may be termed radial offset. As a consequence, there is a continuing need to improve head switch times and provide higher performance disk drives.

SUMMARY OF THE INVENTION

An object of the invention is to minimize the time required to perform a head switch from a current head to a target head. The invention takes advantage of the fact that a dual stage actuator provides an individual actuator for each head and therefore advantageously aligns a target head with a target track with the target head second stage actuator before a head switch occurs. The radial offset required to align the target head with the target track may be either calibrated at startup during a calibration period or may preferably be measured dynamically during normal disk operations. The invention can be applied to dual stage actuators using a milli-actuator structure or a micro-actuator structure.

In one aspect, the invention provides a method to measure the radial offset of a read/write head for head switching operations in a disk drive. The disk drive has a plurality of disk surfaces, a head actuator having a first stage actuator means and a plurality of head arms rotatable in unison about a pivot by the first stage actuator means. Each head arm has a head for reading and writing on a respective disk surface. Each head is independently movable by a respective second stage actuator means. The disk drive has a servo controller and a servo read channel for reading servo signals from a head and positioning the first and second stage actuator means. The method comprises the steps of: track following at a selected cylinder location with a first head with the servo controller to establish a first position error signal; switching to a target head; reading a second position error signal with the servo controller at the selected cylinder location with the target head; computing a measure of the radial offset between the first head and the target head based on a difference between the first position error signal and the second position error signal; and writing the radial offset into a radial offset table.

Preferably the radial offset measurement is performed over a predetermined number of head switches wherein the radial offset is averaged over the predetermined number of head switches. The radial offset averaging may be performed during a calibration period or may be performed during normal disk operations.

The invention also provides a method to adjust the radial offset of a head for performing a head switch from a first head to a target head over a target track. The method is employed in a disk drive having a plurality of disk surfaces, a head actuator having a first stage actuator means and a plurality of head arms rotatable in unison about a pivot by the first stage actuator means. Each head arm has a head for reading and writing on a respective disk surface and each head is independently movable by a respective second stage actuator means. The disk drive further comprises a radial offset table for storing mutual radial offsets between heads, and a servo controller for reading servo signals from a head for positioning the first and second stage actuator means. The method of the invention reads a radial offset for a target head from the radial offset table and calculates an offset compensation signal for the target head second stage actuator for positioning the target head based on the radial offset. The method of the invention then applies the offset compensation signal to the target head second stage actuator before the head switch occurs from the first head to the target head.

In an alternate embodiment, the disk drive has a plurality of servo read channels and the method includes the steps of track following on a first head using a first servo read channel for performing data read or write operations and, while continuing to track follow on the first head, determining a target head for a head switch and reading a position error signal from the target head using a second servo read channel. The invention calculates a compensation signal for the target head and applies the compensation signal to the target head second stage actuator means to correct the position of the target head. After completing the data read or write operation with the first head the method performs a head switch from the first head to the target head.

DETAILED DESCRIPTION OF THE PREFERRED EMBODIMENT

Figure 1:
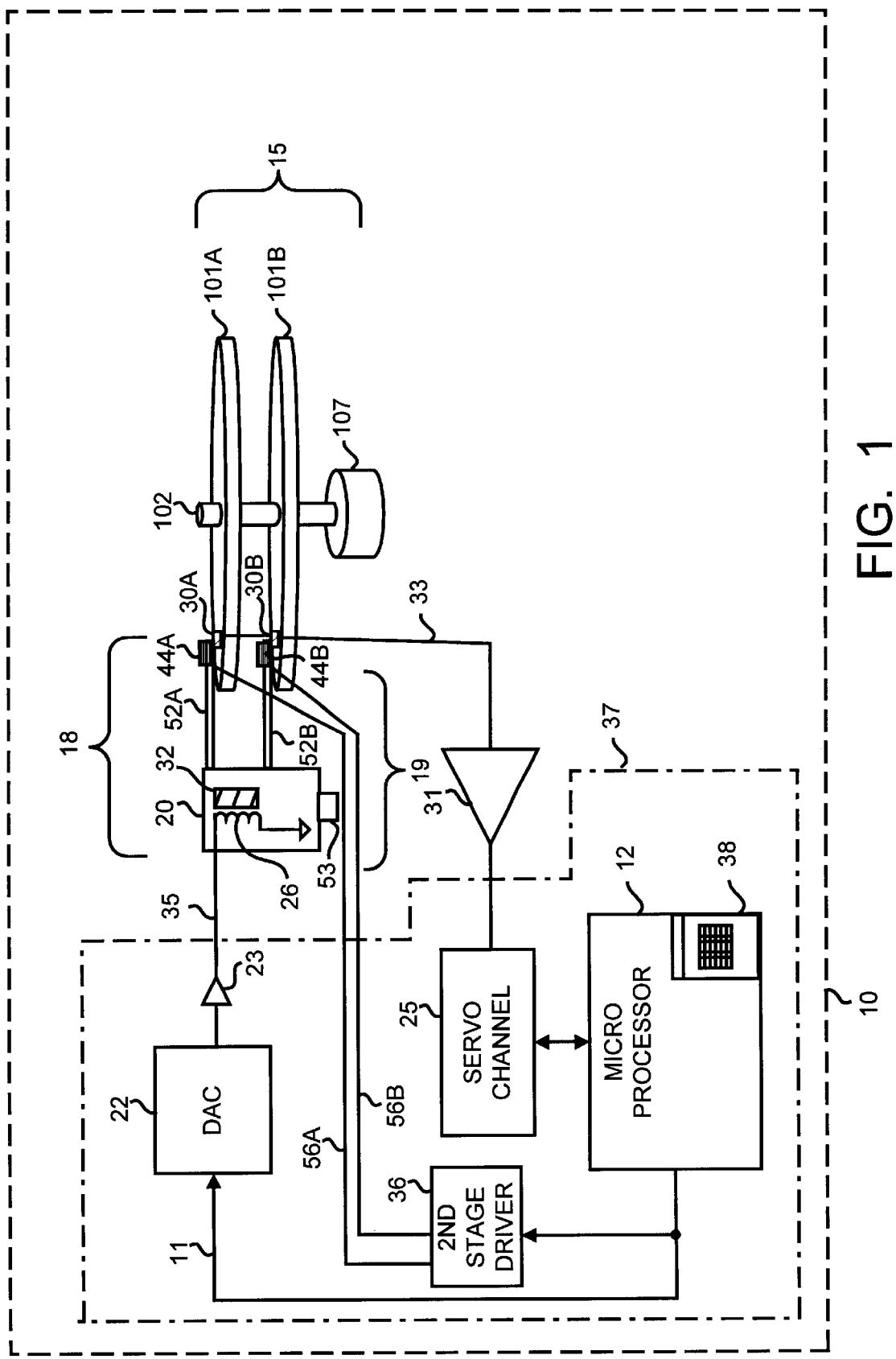
FIG. 1 shows a disk drive of the invention employing dual stage actuators.

Refer now to FIG. 1 which shows a disk drive 10 with a dual stage actuator head stack assembly 18 controlled by a servo controller 37. The dual stage actuator head stack assembly 18 positions the multiple read/write heads 30A and 30B over a set of disks 101A and 101B. The disk drive 10 reads and writes data on the set of disks 101A and 101B via the heads 30A, 30B.

The dual stage actuator head stack assembly 18 has a first stage actuator 19 and multiple second stage actuators 44A and 44B. The first stage actuator 19 and multiple second stage actuators together cooperate to move the multiple read/write heads 30A and 30B. The first stage actuator 19 comprises a voice coil motor, VCM 20 and multiple arm/suspension assemblies 52A and 52B. The multiple arm/suspension assemblies 52A and 52B are simultaneously rotated about pivot 53 by VCM 20. Arm/suspension assemblies 52A and 52B support two second stage actuators 44A and 44B, respectively. Two embodiments of a second stage actuator are provided and are described in more detail below. The read/write heads 30A and 30B are precisely moved by attachment to the second stage actuators 44A and 44B.

A head disk assembly 15 comprises the set of disks 101A and 101B , a spindle 102 and a spindle motor 107. The set of disks 101A and 101B are mounted on spindle 102 in a well known manner. Spindle motor 107 drives the spindle 102 at a constant speed also in a well known manner. Each one of the set of disks 101A and 101B further has multiple servo wedges for use with the servo controller 37. The servo controller 37 controls the position of the multiple read/write heads 30A and 30B. Each servo wedge further comprises multiple servo tracks created and configured in a well-known manner.

The disk drive 10 controls the operation of the head stack assembly 18 with the servo controller 37. The servo controller 37 comprises a microprocessor 12, a servo read channel 25, a second stage driver 36, a digital to analog converter, DAC 22, and a current driver 23. DAC 22, converts digital control signals, from microprocessor 12 via line 11, to analog control signals that are further provided to the current driver 23. The VCM 20 is connected to the current driver 23 by line 35. The VCM 20 swings arm/suspension assemblies 52A, 52B and attached second stage actuators 44A, 44B in response to commands from the microprocessor 12. The second stage actuators 44A and 44B provide a limited range of motion for the multiple read/write heads 30A and 30B over the set of disks 101A and 101B respectively. Microprocessor 12 provides commands to second stage driver array 36 to provide signals to move second stage actuators 44A, via control lines 56A and 56B respectively. The microprocessor 12 further comprises memory 38 for storage of data such as parameter tables used to control the second stage actuators 44A and 44B. Preamplifier 31 selectively processes signals from heads 30A, 30B via line 33 to provide a position error signal to the servo channel 25 for calculation of head position.

In summary, for seek operations, Microprocessor 12 rotates head stack assembly 18 to position the heads over a target cylinder by controlling first stage actuator 19. Assuming for example that the targeted track is on disk 101A, head 30A is selected to provide position signals to servo channel 25 and Microprocessor 12. When head 30A is over the target track, Microprocessor keeps the head on track precisely in a closed loop servo process by controlling second stage actuator 44A and if necessary, first stage actuator 19 responsive to position error signals from head 30A and servo channel 25. Similarly, if the target track is on disk 101B, head 30B provides position error signals and is maintained on track by controlling second stage actuator 44B.

Figure 2:
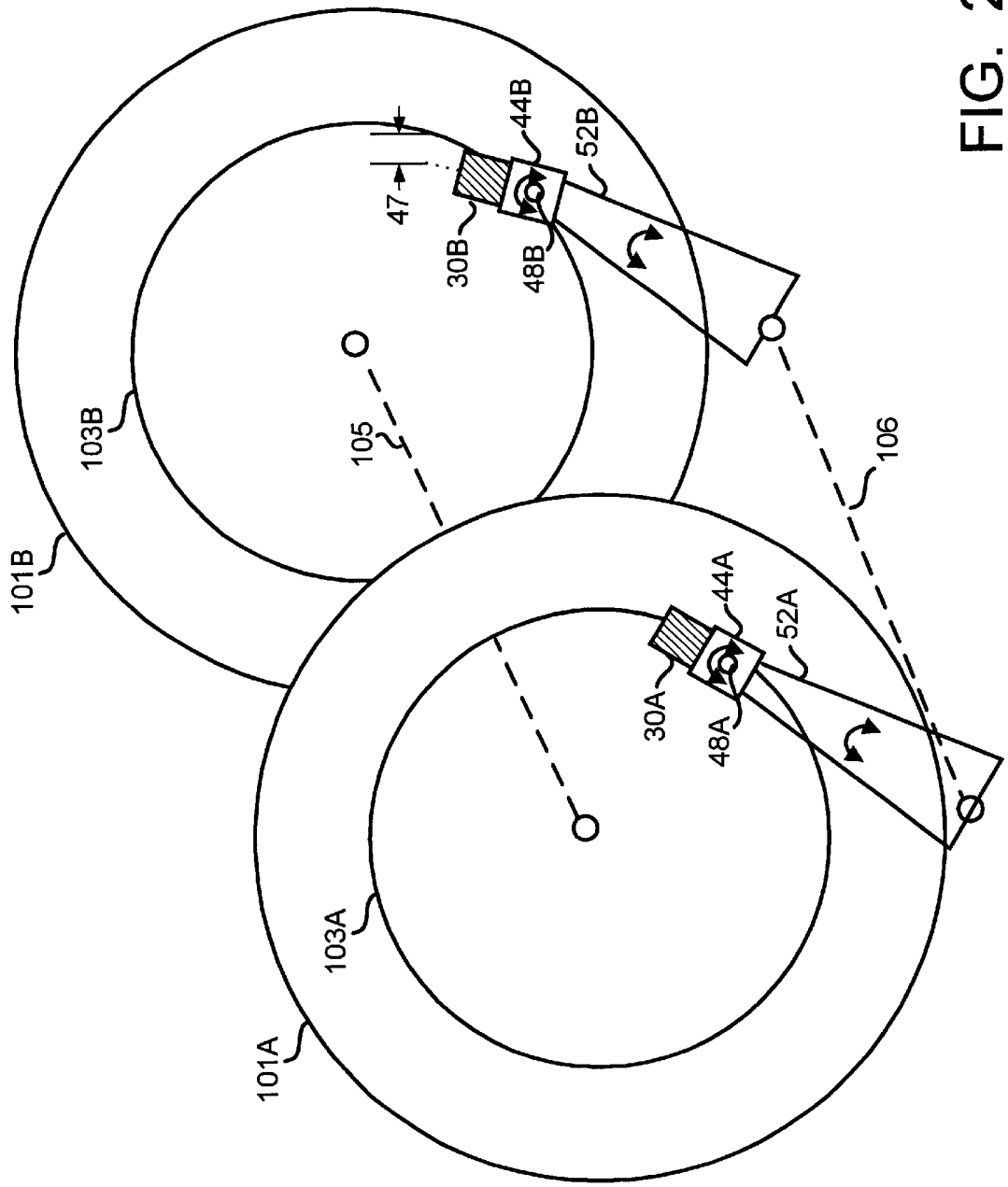
FIG. 2 shows a schematic diagram of two stacked dual stage actuator arms deployed over two stacked magnetic disks which are shown offset for clarity and showing the radial offset between heads.

Refer now to FIG. 2 which shows a schematic representation of two disk/actuator combinations illustrating the radial offset between heads 3A and 3B. The first disk 101A has a track 103A with servo information written on it in a conventional manner. Similarly a second disk 101B has a track 103B also with servo information written on it in a conventional manner. The set of disks 101A and 101B are rotating on a common spindle axis 105. The disks are shown offset for clarity of presentation. Arm/suspension assemblies 52A and 52B are connected to first stage actuator 19 (shown in FIG. 1) and are pivoted in unison about a common axis 106. Second stage actuator 44A is pivoted about axis 48A and is supported by arm/suspension assembly 52A. Similarly second stage actuator 44B pivots about axis 48B and is supported by arm suspension assembly 52B. As indicated in FIG. 2, the second stage actuators 44A and 44B are able to independently (of each other) pivot about respective axes 48A, 48B. Due to variations in manufacturing and assembly of head stack assembly 18 and its components, an offset shown as 47 can exist between heads. In the example shown, example, from head 30A to head 30B. Since the method of the invention tracks changes in radial offset during operation, a separate calibration procedure is not needed. The invention constantly adjusts for variations in radial offset.

A table of radial offset entries for each head is stored in memory. One example table is shown in Table A. Table A shows a table of offsets from a current head. In this example a head switch from may be made to five other heads.

TABLE A

| CURRENT HEAD | TARGET HEAD → | | | | | |
|---|---|---|---|---|---|---|
| ↓ | 1 | 2 | 3 | 4 | 5 | 6 |
| 1 | 0 | OFFSET 1-2 | OFFSET 1-3 | OFFSET 1-4 | OFFSET 1-5 | OFFSET 1-6 |
| 2 | OFFSET 2-1 | 0 | OFFSET 2-3 | OFFSET 2-4 | OFFSET 2-5 | OFFSET 2-6 |
| 3 | OFFSET 3-1 | OFFSET 3-2 | 0 | OFFSET 3-4 | OFFSET 3-5 | OFFSET 3-6 |
| 4 | OFFSET 4-1 | OFFSET 4-2 | OFFSET 4-3 | 0 | OFFSET 4-5 | OFFSET 4-6 |
| 5 | OFFSET 5-1 | OFFSET 5-2 | OFFSET 5-3 | OFFSET 5-4 | 0 | OFFSET 5-6 |
| 6 | OFFSET 6-1 | OFFSET 6-2 | OFFSET 6-3 | OFFSET 6-4 | OFFSET 6-5 | 0 | when head 30A is centered on track 103A, head 30B is radially displaced from track 103B, creating offset 47. In a reversed situation, when head 30B is centered on track 103B, head 30A may be offset from track 103A.

The radial offset between heads, such as that indicated by 47 in FIG. 2, can detrimentally impact head switching time if the head switch is performed conventionally, i.e. serially, by first switching to the target head, waiting for a servo wedge, reading the servo information, and then applying a correction to center the head. Frequently multiple servo sectors must be read and multiple corrections applied to insure that the new target head is centered on the track. Instead, the invention provides for correcting the offset prior to the head switch so that the new target head is in position for a read or write operation in a more timely manner.

Figure 5:
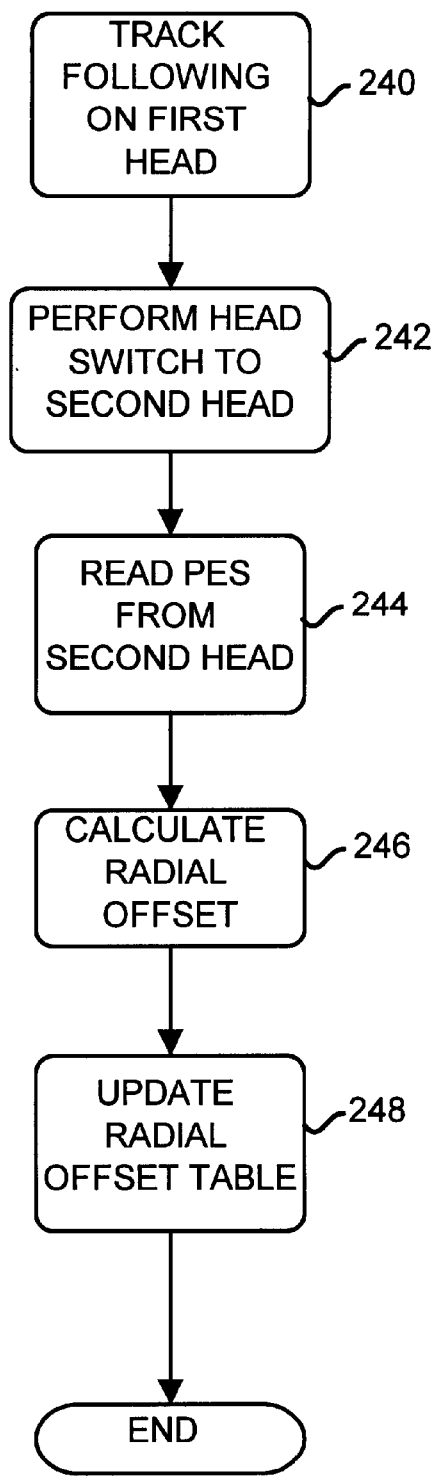
FIG. 5 shows the method of the invention to measure the radial offset of a read/write head and store the radial offset in a radial offset table for use with a dual stage actuator.

FIG. 5 shows the method of the invention to measure the radial offset of a read/write head and store radial offset values in a radial offset table for use with a dual stage actuator. The method starts at step 240 by closed loop track following using a first head to establish a position error signal which is nominally zero. A head switch to a second head is performed in step 242. The position error signal is then read from the second head in step 244 in an open loop process. In step 246, the measurement of the radial offset between the first and second heads is calculated based on the difference in position error signals between the first and second heads. The new radial offset value, for the switch from the first head to the second head, is written to a radial offset table in step 248.

In a preferred embodiment of the invention, the radial offset is averaged over multiple head switches. This averaging of the radial offset value accounts for normal statistical variations versus a single radial offset measurement. The average value may be accumulated during a specific period of time such as power-up of the disk drive or, preferably during drive operation, a running average may be accumulated over a predetermined number of recent head switches. These statistical variations may be caused by noise in the read channel, environmental factors such as temperature and vibration, and runout. Radial offset values may be taken for multiple head switches from the same two heads, for In one embodiment, coefficients proportional to the force necessary to move the micro-actuator may be stored in the table. The table is used during normal disk operations to move the target head close to its target track.

Although Table A shows entries for all combinations of current head to target head offsets, the table may be minimized to reduce storage requirements. For example, by simply providing offset entries referenced to a single head such as head 1, only 5 entries would be required. In this embodiment, the offset between any two heads would be determined by calculating the difference in offset relative to the reference head.

Figure 6:
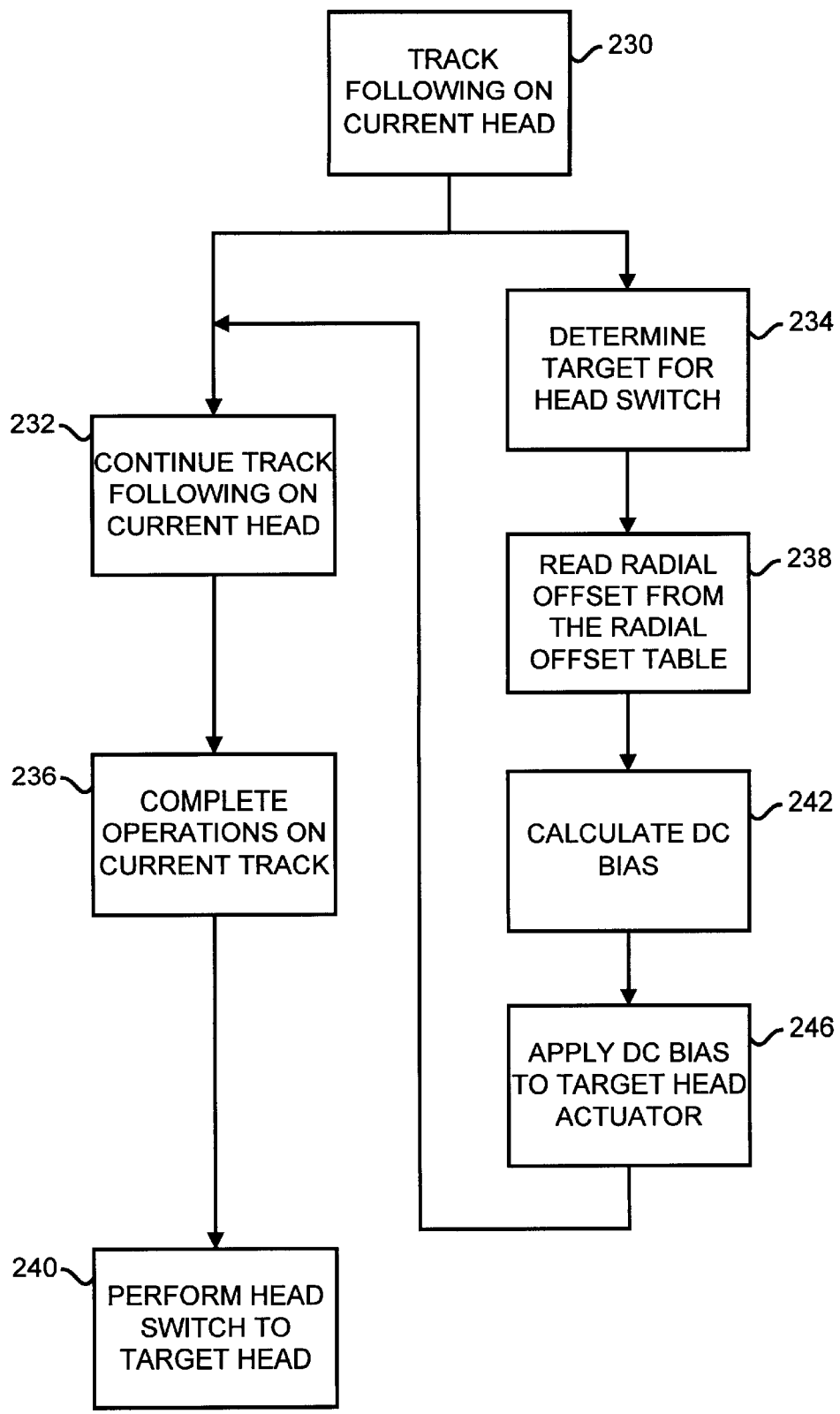
FIG. 6 shows the method of the invention to adjust the radial offset of a target head prior to a head switch.

FIG. 6 shows the method of the invention to adjust the radial offset of a read/write head prior to a head switch with a dual stage actuator. The head switch is to be made from a current head to a target head over a target track. The process in step 230 provides track following on a current head during normal operations. In step 234, an anticipated target head is specified. While track following on the current head is maintained at step 232, the radial offset for the switch from a current head to the target head is read from the radial offset table in step 238. In step 242, a DC Bias is calculated for the target head's second stage actuator from the value read from the radial offset table. In step 246, the DC bias is applied to the target head's second stage actuator. The DC Bias translates to the force necessary to move the head enough to compensate for the radial offset. At step 236 operations are completed on the current track and at step 240, a head switch is performed to the target head which has been pre-positioned to be closer to target track center.

Figure 3:
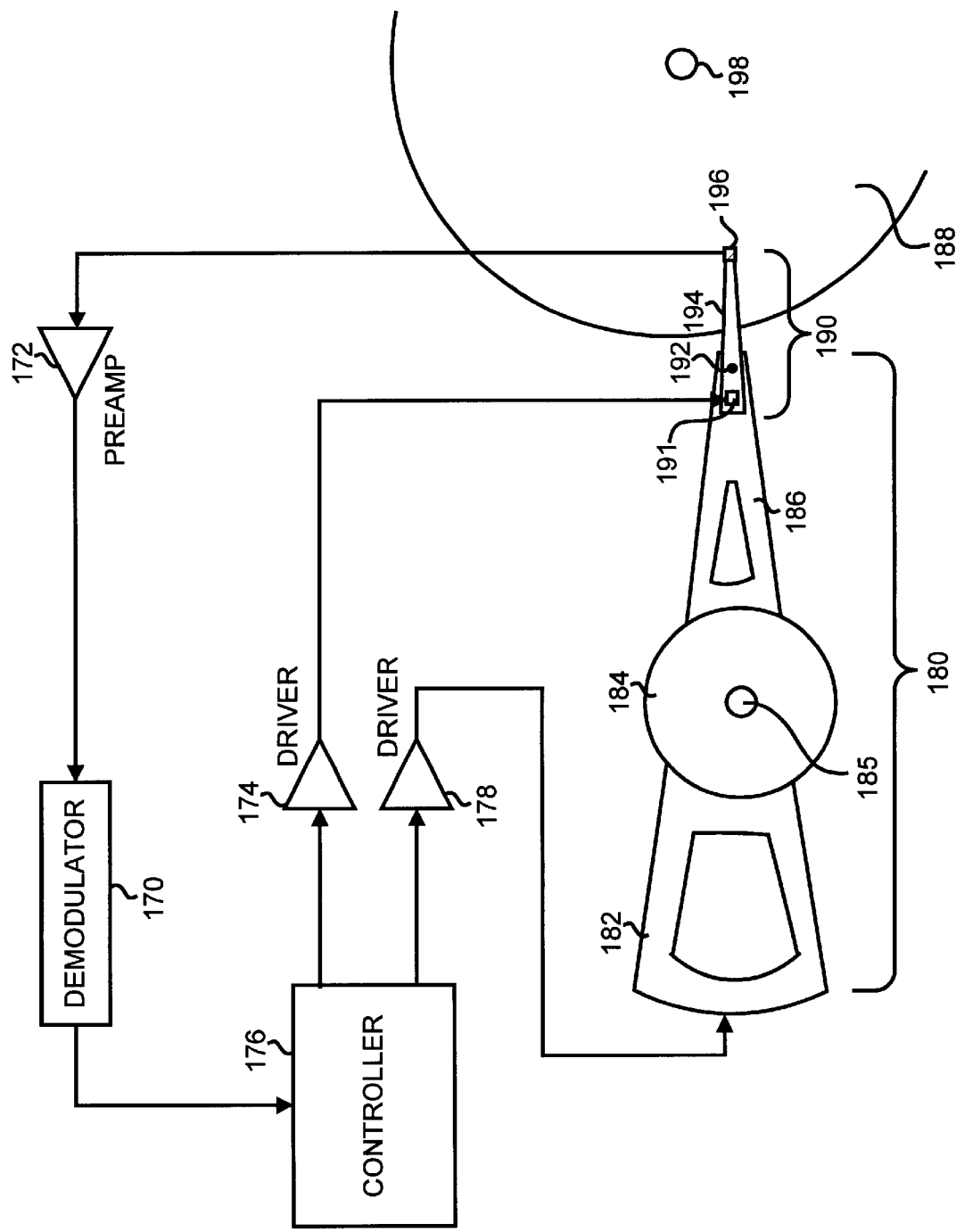
FIG. 3 shows a milli-actuator and a servo control system of the invention.

FIG. 3 shows one example embodiment of the dual stage actuator as a milli-actuator. The milli-actuator comprises a first stage actuator 180 having a body portion 184. A voice coil motor 182 connected to the body 184 rotates the first stage actuator 180 around a pivot 185. An arm 186 is cantilevered from the body 184. The second stage actuator 190 of the dual stage actuator comprises a milli-actuator motor 191, a suspension 194, and a pivot 192. The second stage actuator 190 is connected to a suspension arm 186. The milli-actuator motor 190 moves the suspension 194 about the pivot 192. A read/write head 196 is supported by the suspension 194. The read/write head 196 reads a servo signal from the disk 188 to a preamplifier 172. The disk 188 rotates about spindle 198. The preamplifier 172 provides a signal to a demodulator 170 that provides a position error signal to a controller 176. The controller 176 controls a voice coil motor driver 178 that coarsely controls the radial position of the actuator through voice coil motor 182. The controller 176 also provides a signal to a second stage driver 174 that finely positions the suspension 194 and head 196 over a target track by controlling the milli-actuator motor 191.

Figure 4:
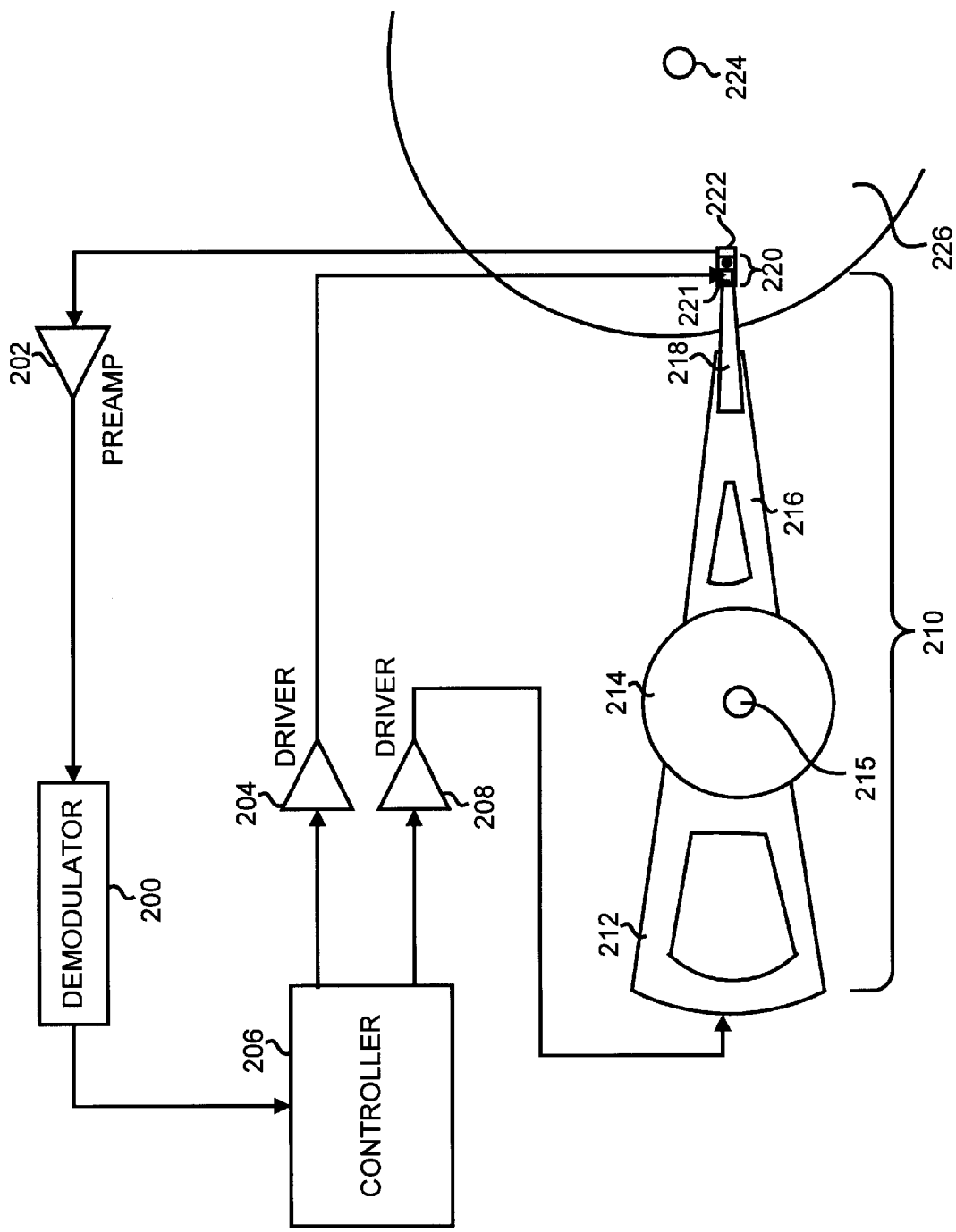
FIG. 4 shows a micro-actuator and a servo control system of the invention.

FIG. 4 shows an alternative example embodiment of the dual stage actuator as a micro-actuator. The micro-actuator comprises driven first stage actuator 210 comprising a voice coil motor 212 which rotates the entire mechanism about a pivot 215. A body 214 holds suspension arm 216. The second stage 225 of the dual stage actuator comprises an arm 218, and a micro-actuator 220. The arm 218 is attached to the suspension arm216. The arm 218 holds the micro-actuator 220, which may be a piezo-electric positioner such as a piezo-electric motor, to fine position the read/write head 222 across a disk 226. Those skilled in the art will appreciate that other types of fine positioning mechanisms, such as voice coil based mechanisms, may be used in the micro-actuator without deviating from the spirit and scope of the invention. The disk 226 rotates on spindle 224. The read/write head 222 provides a signal to the preamplifier 202. The preamplifier 202 provides a signal to a demodulator 200 that demodulates the amplified signal from preamplifier 202. The demodulator 200 provides a position error signal to a controller 206. The controller 206 drives driver 204 which controls the micro-actuator 220. The controller 206 also provides a signal to a voice coil motor driver 208 to control the position of the suspension arm 216 about pivot bearing 215. In operation the controller, during a head switch, positions the read/write head 222 over a track and the micro-actuator adjusts for radial offset.

The methods of the invention are useful for both single channel and dual channel servo control systems.

Figure 7:
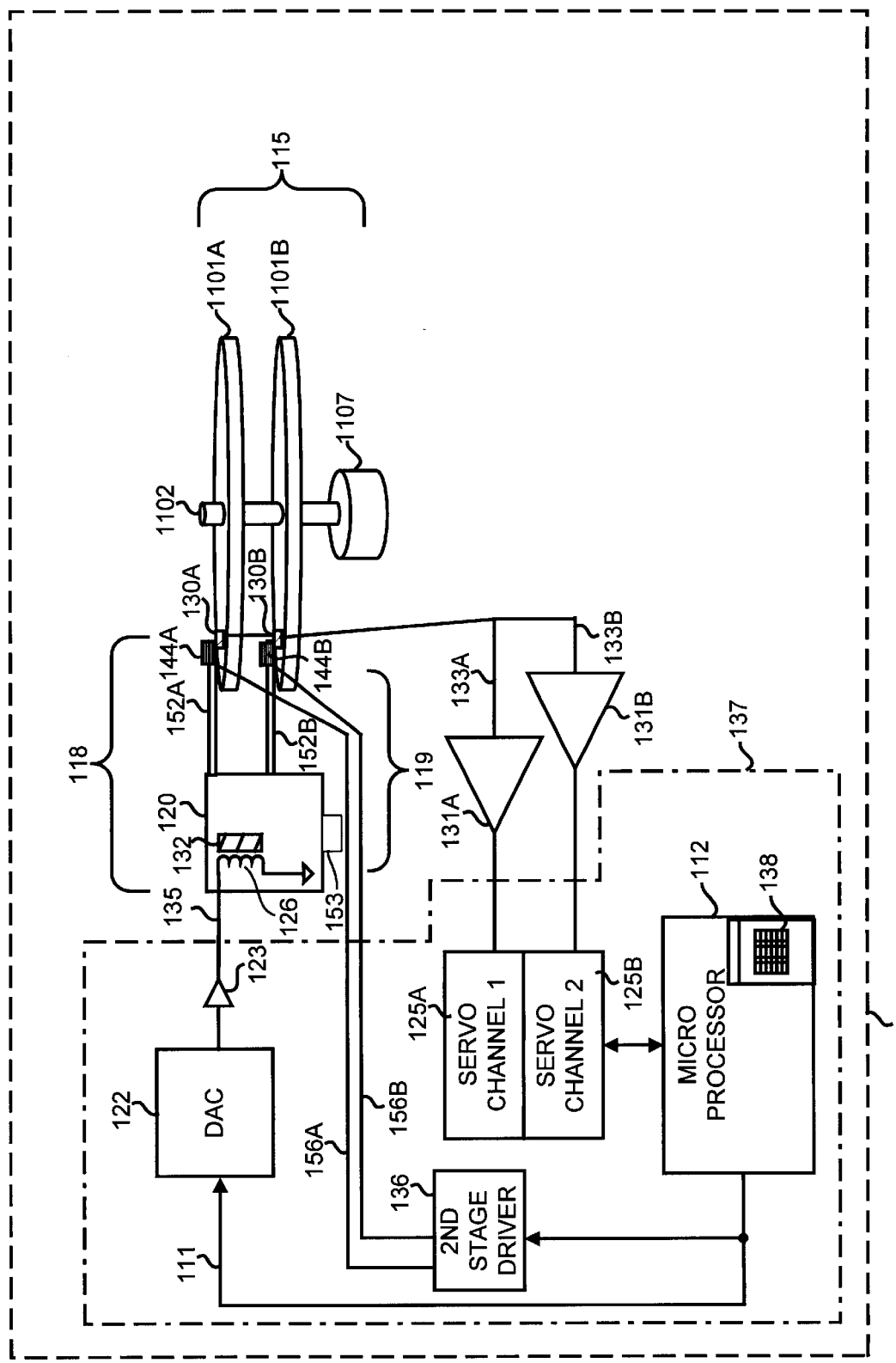
FIG. 7 shows the disk drive of the invention having a dual channel servo system.

Refer now to FIG. 7 which shows a disk drive 110 with a dual stage actuator head stack assembly 118 controlled by a dual channel servo controller 137. The dual stage actuator head stack assembly 118 positions the multiple read/write heads 130A and 130B over a set of disks 101A and 101B. The set of disks 1101A and 1101B are part of a head disk assembly 115.

The dual stage actuator head stack assembly 118 has a first stage actuator 119 and multiple second stage actuators 144A and 144B. The first stage actuator 119 and second stage actuators 144A,144B cooperate to move the read/write heads 130A and 130B over tracks on disks 1101A, 1101B. The first stage actuator 119 comprises a voice coil motor, VCM 120 which swings multiple arm/suspension assemblies 152A and 152B about a pivot 153. The arm/suspension assemblies 152A and 152B support two second stage actuators 144A and 144B, respectively. Two embodiments of a second stage actuator are provided as described in more detail above. The multiple read/write heads 130A and 130B are attached to the second stage actuators 144A and 144B respectively.

The head disk assembly 115 comprises the set of disks 1101A and 1101B, a spindle 1102 and a spindle motor 1107. The set of disks 1101A and 1101B are mounted on spindle 1102 in a well known manner. Spindle motor 1107 drives the spindle 1102 at a constant speed also in a well known manner. Each one of the set of disks 1101A and 1101B further have multiple servo wedges for use with the dual channel servo controller 137. Each servo wedge further comprises multiple servo tracks created and configured in a well-known manner.

The disk drive 110 controls the operation of the multiple arm dual stage actuators with the dual channel servo controller 137. The dual channel servo controller 137 comprises a microprocessor 112, a first servo read channel 125A, a second servo read channel 125B, a second stage driver array 136, a digital to analog converter, DAC 122, and a current driver 123. DAC 122 converts digital control signals, from microprocessor 112 via line 111, to analog control signals that are further provided to the current driver 123. The VCM 120 is connected to the current driver 123 by line 135. The VCM 120 employs a voice coil 126 that varies a magnetic field in the proximity of a permanent magnet 132. The magnetic field is varied by changing the VCM coil 126 current. Microprocessor 112, implementing a sampled servo control program, controls the current to the VCM 120 through DAC 122 and current driver 123. The VCM 120 simultaneously rotates arm/suspension assemblies 152A, 152B about pivot 153 in response to commands from the microprocessor 112. Second stage actuators 144A and 1441B are also moved by VCM 120 due to their attachment to arm/suspension assemblies 152A, 152B. The second stage actuators 144A and 144B provide a limited range of movement of each of the read/write heads 130A and 130B to provide fine positioning over tracks on the set of disks 1101A and 1101B respectively. The second stage actuators 144A, 144B are driven by control signals from second stage driver array 136 on lines 156A, 156B respectively. Microprocessor 112 send commands to second stage driver array 136 to selectively move second stage actuators 144A,144B. The microprocessor 112 further comprises memory 138 for storage of data such as parameter tables used to control second stage actuators 144A and 144B. Preamplifier 131A conditions position signals from the head 130A and preamplifier 131B conditions position signals from the head 130B. Preamplifier 131A provides a position error signal to a servo read channel 125A. Preamplifier 131B provides a position error signal to a servo read channel 125B.

Multiple second stage actuators 144A and 144B are coarsely positioned by first stage actuator 119. In an exemplary embodiment, for read/write operations on disk 1101A, read/write head 130A is selected to provide a position error signal to microprocessor 112 through preamplifier 131A and servo channel 125A. The position error signal from head 130A then provides for closed loop control of first stage actuator 119 and second stage actuator 144A. When a head switch is anticipated to continue read/write operations on disk 1101B on the current cylinder, read/write head 130B is selected to provide a position error signal to microprocessor 112 through preamplifier 133B and servo read channel 125B. While track following on disk 1101A, a limited range of motion is available for head 130B using second stage actuator 144B. Second stage driver array 136 provides current to drive each one of second stage actuators 144A and 144B via lines 156A and 156B respectively. Microprocessor 112 loads registers in second stage driver array 36 to independently control the actuators 144A and 144B. In this manner, when a head switch is performed from head 130A to 130B, head 130B will be pre-positioned on track center and a read or write operation can resume without delays required to re-position or settle the target head.

Figure 8:
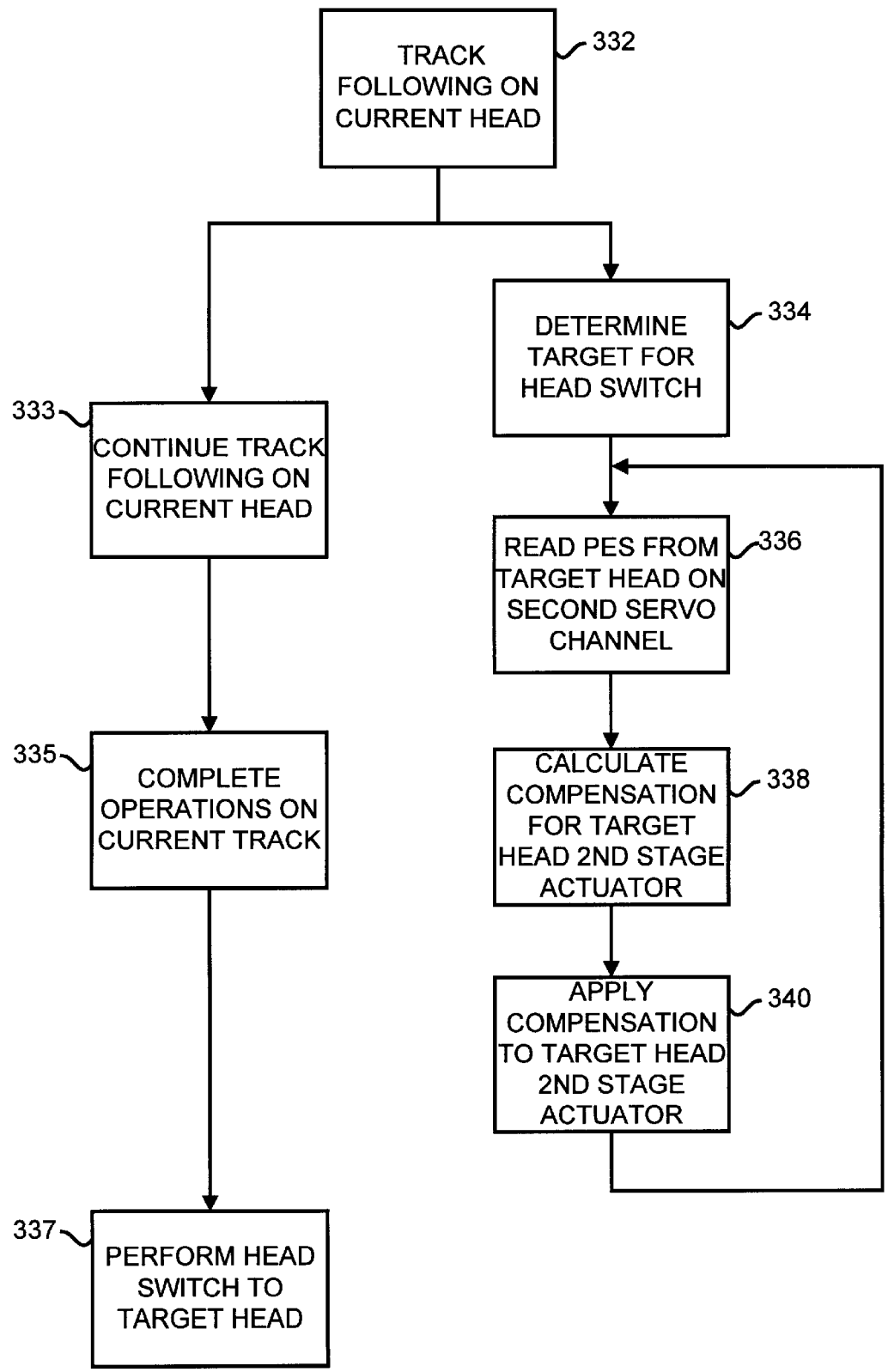
FIG. 8 shows the method of the invention with a dual channel servo system to adjust the radial offset of a target head by track following on the target head.

FIG. 8 shows the method of the invention to provide a limited track following capability on a target head while track following on a current head when a second servo read channel is available. The method begins operation at 332 by track following on a current track with a PES read from the currently selected head using the first servo read channel. A targeted head for a next head switch is determined at 334. While continuing to track follow and perform operations on the current head in step 333, a PES is read from the target head on the second servo read channel at 336. A compensation is calculated at 338 for the target head actuator and at 340 the compensation is applied to the target head second stage actuator. When operations on the current track are completed at 335, the method performs a head switch to the target head at 337. Beneficially the target head is pre-positioned at track center by performing track following on the target head in parallel with track following on the Rent head.

We claim:

1. In a disk drive having a plurality of disk surfaces, a head actuator having a first stage actuator means and a plurality of head arms rotatable in unison about a pivot by the first stage actuator means, each head arm having a head for reading and writing on a respective disk surface, each head independently movable by a respective second stage actuator means, a radial offset table for storing mutual radial offsets between heads, and a servo controller for reading servo signals from a head for positioning the first and second stage actuator means, a method to adjust the radial offset of a head for performing a head switch from a first head to a target head over a target track, the method comprising the steps of:

a) reading a radial offset for the target head from the radial offset table;

b) calculating an offset compensation signal for the target head second stage actuator for positioning the target head based on the radial offset; and c) applying the offset compensation signal to the target head second stage actuator before the head switch occurs from the first head to the target head.

2. The method of claim 1 wherein the second stage actuator further comprises a milli-actuator.

3. The method of claim 1 wherein the second stage actuator further comprises a micro-actuator.

4. In a disk drive having a plurality of disk surfaces, a head actuator having a first stage actuator means and a plurality of head arms rotatable in unison about a pivot by the first stage actuator means, each head arm having a head for reading and writing on a respective disk surface, each head independently movable by a respective second stage actuator means, and a servo controller having a plurality of servo read channels for reading servo signals from a plurality of heads for positioning the first and second stage actuator means, a method to reduce the time required to perform a head switch between a first head and a target head, the method comprising the steps of:

(a) track following on a first head for performing a data read or write operation using a first servo read channel;

(b) while continuing to track follow on the first head:

(c) determining a target head for a head switch and reading a position error signal from the target head using a second servo read channel;

(d) calculating a compensation signal for the target head and applying the compensation signal to the target head second stage actuator means to correct the position of the target head; and (e) performing the head switch from the first head to the target head after completing the data read or write operation with the first head.

\* \* \* \* \*